J. R. GAMMETER.
BUMPER.
APPLICATION FILED NOV. 2, 1918.

1,329,339.

Patented Jan. 27, 1920.

Inventor
John R. Gammeter
By Robert McPherson
Atty.

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

BUMPER.

1,329,339.  Specification of Letters Patent.  Patented Jan. 27, 1920.

Application filed November 2, 1918. Serial No. 260,890.

*To all whom it may concern:*

Be it known that I, JOHN R. GAMMETER, a citizen of the United States, residing at Akron, in the county of Summit and State of Ohio, have invented a certain new and useful Bumper, of which the following is a specification.

This invention relates to rubber bumpers for use on closet seats and in other situations, and its object is to provide a construction and mode of attachment which is simple and effective and which enables the rubber part to be more cheaply manufactured than heretofore.

Of the accompanying drawings.

Figure 1:
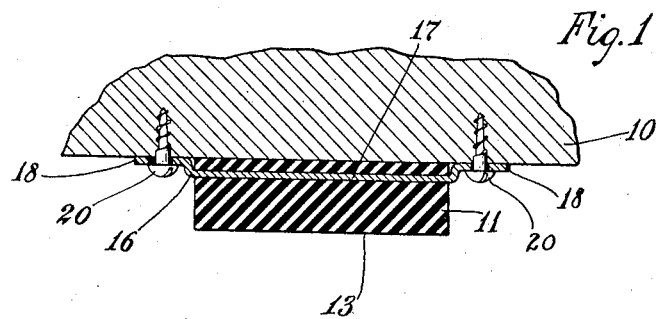
Figure 1 is a longitudinal sectional view showing a bumper constructed and mounted according to my invention.
Figure 2:
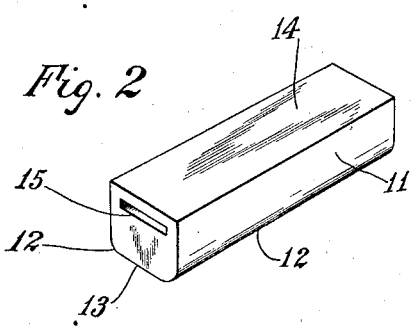
Fig. 2 is a perspective view of the rubber cushion.
Figure 3:
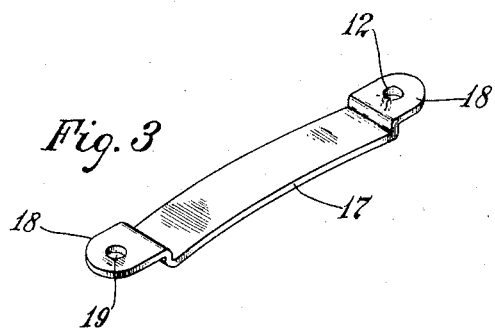
Fig. 3 is a perspective view of the metal attaching plate.

In the drawings, 10 indicates a wooden base such as a closet seat upon which the bumper is mounted. 11 is a cushion of soft or semi-soft vulcanized rubber compound formed substantially as an elongated quadrilateral prism having somewhat rounded longitudinal corner edges 12 at the sides of its outer or bumping surface 13. Near the base surface 14, and in a plane parallel thereto, the body of the cushion member 11 is formed with a wide and shallow longitudinal through aperture 15 adapted to receive a transversely-flat, metallic attaching plate 16 which extends completely through the cushion and projects beyond the latter at both ends. The middle portion 17 of this plate, occupying the aperture in the cushion, is offset from the two end portions or ears 18 which are formed with holes 19 to receive suitable attaching devices such as the screws 20 for securing the plate to the wooden base 10, the amount of this offset being nearly equal to the thickness of the rubber part between the aperture 15 and the base surface 14. I prefer to make this plate flexible and curve it longitudinally and convexly toward the base side, as indicated in Fig. 3, before the bumper is attached to the base 10, so that when the plate straightens out from the pressure of the screws, as indicated in Fig. 1, the rubber will be somewhat compressed thereunder and a tight contact produced between the cushion 11 and the base 10.

A bumper of this construction may be very cheaply manufactured, especially as to the rubber part thereof, which, instead of being vulcanized in a mold pocket or cavity, can be run in long lengths through the die of a tubing machine, together with a metal ribbon for forming the aperture 15, in a manner very similar to the mode of manufacturing carriage tires, can then be vulcanized in open heat, the metal ribbon removed, the rubber cut transversely into sections of the desired length for forming the cushion members 10, and the attaching plate slipped into the aperture 15.

I claim:

1. A bumper for closet seats and the like comprising a rubber cushion formed with a relatively wide and shallow longitudinal through aperture adjacent to and parallel with the base surface thereof, and a transversely-flat attaching plate having apertured portions at both ends and an offset middle portion occupying the aperture in said cushion.

2. A bumper for closet seats and the like comprising a rubber cushion formed with a longitudinal aperture adjacent and parallel to the base surface thereof, and a transversely-flat, flexible attaching plate occupying said aperture and longitudinally and convexly curved in the direction of said base surface, said plate projecting beyond the cushion at both ends.

3. A bumper for closet seats and the like comprising a rubber cushion formed with a base surface on one side thereof which contacts with a support when the bumper is attached thereto, and with an aperture adjacent said support, a flexible attaching plate occupying said aperture and longitudinally and convexly curved in the direction of said base surface, and means for attaching said plate to the support.

4. A bumper for closet seats and the like, comprising a rubber cushion formed with a base surface on one side thereof which contacts with a support when the bumper is attached thereto, and with an aperture adjacent to the base surface, a flexible attaching plate occupying said aperture, and means attached to said support and acting on the plate to bend the latter and compress a portion of the cushion between the plate and support when the bumper is fastened to the support.

In testimony whereof I have hereunto set my hand this first day of November 1918.

JOHN R. GAMMETER.